(12) United States Patent
Seay

(10) Patent No.: US 8,622,667 B1
(45) Date of Patent: Jan. 7, 2014

(54) DRILL MOTOR ADAPTER

(76) Inventor: Earl L. Seay, Holtville, CA (US)

( * ) Notice: Subject to any disclaimer, the term of this patent is extended or adjusted under 35 U.S.C. 154(b) by 26 days.

(21) Appl. No.: 13/237,297

(22) Filed: Sep. 20, 2011

(51) Int. Cl.
*B23B 51/12* (2006.01)
*B25F 3/00* (2006.01)

(52) U.S. Cl.
USPC .............. 408/239 A; 279/14; 279/76; 279/79; 279/140; 7/158; 7/165

(58) Field of Classification Search
USPC ........ 408/239 A, 241 R; 279/14, 76, 79, 140, 279/143–145; 7/158, 165
IPC ....................................................... B23B 51/12
See application file for complete search history.

(56) References Cited

U.S. PATENT DOCUMENTS

| | | | | |
|---|---|---|---|---|
| 1,355,793 A | * | 10/1920 | Bernay | 175/419 |
| 1,797,986 A | * | 3/1931 | King | 279/76 |
| 1,887,655 A | * | 11/1932 | Marple | 292/353 |
| 2,138,253 A | * | 11/1938 | Lynch | 279/29 |
| 2,364,733 A | * | 12/1944 | McCollum | 279/76 |
| 2,397,026 A | * | 3/1946 | Marker et al. | 279/79 |
| 2,969,243 A | * | 1/1961 | Drazick | 279/76 |
| 3,156,479 A | * | 11/1964 | Drazick | 279/76 |
| 3,336,611 A | * | 8/1967 | Schepp | 7/158 |
| 3,484,114 A | * | 12/1969 | Rodin | 279/144 |
| 3,484,144 A | | 12/1969 | Nash | |
| 3,932,904 A | | 1/1976 | Nilsson et al. | |
| 4,057,260 A | * | 11/1977 | Sigott | 279/77 |
| 4,413,937 A | * | 11/1983 | Gutsche | 408/239 A |
| 4,468,826 A | * | 9/1984 | Moores, Jr. | 7/158 |
| 4,645,015 A | * | 2/1987 | Mitchell | 173/115 |
| 4,796,319 A | * | 1/1989 | Taft | 7/158 |
| 4,944,641 A | | 7/1990 | Alves | |
| 5,090,545 A | | 2/1992 | Nassar | |
| 5,110,145 A | * | 5/1992 | Stewart | 279/24 |
| 5,129,118 A | * | 7/1992 | Walmesley | 7/158 |
| 5,191,666 A | | 3/1993 | Corbin | |
| 5,330,206 A | | 7/1994 | Krumszyn et al. | |
| 5,409,333 A | | 4/1995 | Hu | |
| D358,082 S | | 5/1995 | Trezza | |
| 5,651,647 A | * | 7/1997 | Ray | 408/239 R |
| 6,688,611 B2 | * | 2/2004 | Gifford et al. | 279/71 |
| 7,354,230 B2 | * | 4/2008 | Bauman | 408/239 R |
| 8,057,136 B2 | * | 11/2011 | Chiang | 408/238 |

FOREIGN PATENT DOCUMENTS

| | | | | | |
|---|---|---|---|---|---|
| DE | 2822372 A | * | 11/1979 | | B25B 23/00 |
| GB | 2063114 A | * | 6/1981 | | B23B 31/00 |

* cited by examiner

*Primary Examiner* — Eric A Gates
(74) *Attorney, Agent, or Firm* — Montgomery Patent & Design; Robert C. Montgomery

(57) ABSTRACT

An adapter to convert an electric drill motor being configured with a standard drill bit into a screw gun includes a metal enclosure which slides over a drill chuck to accommodate drill bit and chuck portions. The device also provides a mechanical coupling pin which engages a chuck key aperture to communicate the rotary motion of the drill motor to the device. Once installed upon the drill motor, the device enables connection of standard bit sockets, screwdriver adapters, or similar driving tools. In such a manner, the user can drill a hole, slide the device over the drill chuck, and drive a fastener using the device. This eliminates the need to remove the drill bit and insert a separate driving tool in a repetitive manner to install fasteners.

14 Claims, 5 Drawing Sheets

DRILL MOTOR ADAPTER

RELATED APPLICATIONS

There are no current co-pending applications.

FIELD OF THE INVENTION

The present invention relates generally to drill motor adapters, and in particular, to a drill motor adapter for providing screw gun functionality compatible with an existing electric drill and drill bit.

BACKGROUND OF THE INVENTION

General construction and wood working projects require a wide variety of power tools to accomplish the job properly. Two (2) such common power tools are the power drill and the power screw gun. The ability for the drill to produce a hole in just about any material and the screw gun's ability to quickly install fasteners make them very valuable for a wide range of repetitive tasks, saving time and money and reducing stress on the worker.

Due to the cost of these tools and the fact that they have similar physical parameters, many users find it prudent to own only a power drill and then to use the drill in a manner similar to a screw gun as needed. When the capabilities of a screw gun are needed, the user simply inserts an appropriate screwdriver bit or socket adapter into the chuck of the drill.

Various attempts have been made to provide adapters for drill guns. Examples of these attempts can be seen by reference to several U.S. patents including U.S. Pat. No. 3,484,114, U.S. Pat. No. 5,090,545, U.S. Pat. No. 5,191,666, U.S. Pat. No. 5,330,206, and U.S. Pat. No. 5,409,333.

The use of such adapters can be unfavorable due to the fact that it must be repeated and reversed each time the user wishes to switch between the drill functions and the functions provided by the adapter. In certain cases where the adapter is to be utilized infrequently and where a range of functionality or sizing is desirable, this may acceptable.

However, construction practices which require drilling a hole, inserting a fastener, and then drilling another hole, will require the removal of the drill bit or fastening driver for each and every hole, thus becoming very time consuming. Furthermore, in many construction projects, these fasteners are of a consistent size over large areas of the construction. In this case, the need to constantly interchange the drill bits and adapters is very detrimental, i.e. as compared to having both a drill and a screw gun.

Accordingly, there exists a need for an adapter which is smaller and cheaper than having to purchase a screw gun in addition to a drill, but which facilitates repeated use in a quick and minimally taxing manner. The development of the present invention substantially departs from the conventional solutions and in doing so fulfills this need.

SUMMARY OF THE INVENTION

In view of the foregoing references, the inventor recognized the aforementioned inherent problems and observed that there is a need for a solution. Thus, the object of the present invention is to solve the aforementioned disadvantages and provide for this need.

To achieve the above objectives, it is an object of the present invention to comprise a drill motor adapter for quickly configuring an electric drill motor to perform a screw gun function. The device has an interior bore that slidingly accommodates a standard drill chuck to allow quick conversion from a normal drilling tool to a screw driving tool.

Another object of the present invention is to allow quick attachment of various sized bit sockets and other driver tools which utilize an attaching hex shaft portion. The shaft of the adapter includes a socket receiver portion at an end portion opposite the interior bore.

Yet still another object of the present invention is to allow installation of the device on the drill motor with having to remove a previously installed drill bit, thereby saving significant time for projects which require repeated interchange between the drill and screw driving functions. An extending shaft portion of the apparatus provides an internal drill bit clearance aperture that covers and protects the drill bit and provides sufficient separation between the hex shaft portion and the drill motor.

Yet still another object of the present invention is to secure the device within a chuck key aperture portion of the drill chuck using a spring-loaded anti-rotation pin located within the chuck receiver portion of the apparatus. The pin is further retained in place during use by two (2) retaining rings positioned on the chuck receiver and is installed at an angle such that clockwise rotation of the drill chuck engages the pin and keeps the device installed tightly, but whereby clockwise motioning of the device when the drill is turned off will cause the pin to slide outwardly and allow easy separation and removal of the device from the drill motor.

Yet still another object of the present invention is to provide a similar pair of retaining rings to apply a holding spring force against a bit socket when inserted into the hex aperture portion of the device.

Yet still another object of the present invention is to provide a method of utilizing the device that provides a unique means of using an existing drill motor in a conventional manner, inserting the drill bit and drill chuck into the inner bore portion of the device while continually applying a counter-clockwise rotation of the device, rotating the device until the anti-rotation pin engages the chuck key aperture of the drill chuck, inserting a suitably sized bit socket or other driving tool into the hex aperture portion, driving fasteners into the previously drilled holes; removing the device from the drill motor by applying a clockwise rotation to disengage the anti-rotation pin, repeating the above steps to convert the drill motor back-and-forth between a drilling tool and a screw gun as needed; and, benefiting from time and equipment costs saved by using the present device.

Further objects and advantages of the present invention will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
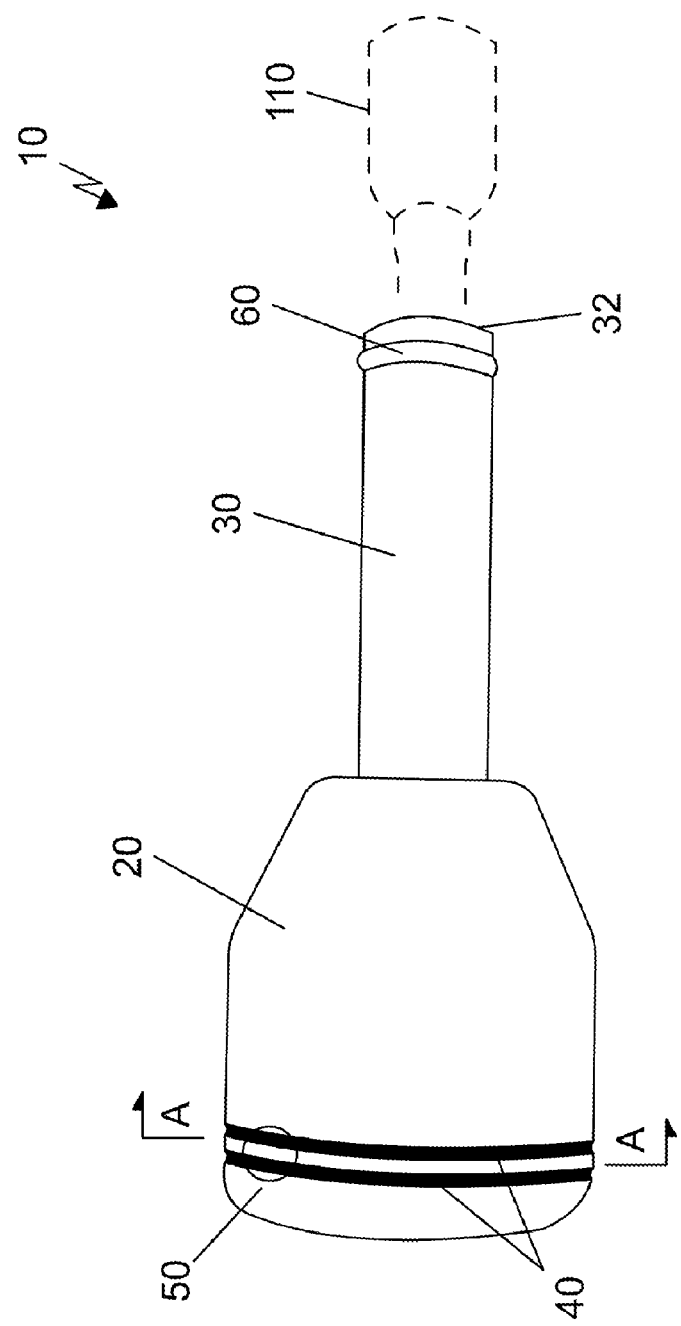
FIG. 1 is a side view of a drill motor adapter 10, according to a preferred embodiment of the present invention.

DESCRIPTIVE KEY 10 drill motor adapter
20 chuck receiver
22 inner bore
24 pin aperture
30 shaft
32 socket receiver portion
34 hex aperture
36 drill bit clearance aperture
40 first retaining ring
42 first retaining ring slot
50 anti-rotate pin
60 second retaining ring
62 second retaining ring slot
100 drill motor
102 drill chuck
104 chuck key aperture
105 drill bit
110 bit socket

DETAILED DESCRIPTION OF THE PREFERRED EMBODIMENT

In accordance with the invention, the best mode is presented in terms of a preferred embodiment, herein depicted within FIGS. 1 through 5. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

The present invention describes a drill motor adapter (herein described as the "device") 10, which provides a means for quickly configuring an electric drill motor 100 to perform a screw gun function. The device 10 provides an interior bore 22 which slidingly accommodates a standard drill chuck portion 102 of an existing drill motor 100 as well as a previously installed drill bit 105 within, thereby allowing quick conversion from a normal drilling tool to a screw driving tool.

Referring now to FIG. 1, a side view of the device 10, according to a preferred embodiment of the present invention, is disclosed. The device 10 comprises a bell-shaped chuck receiver portion 20 comprising an open-ended and cylindrically-shaped structure envisioned to be made of a lightweight material such as aluminum. Said chuck receiver 20 comprises an inner bore portion 22 sized so as to slide over the standard drill chuck portion 102 of an existing drill motor 100 (see FIG. 2a). The device 10 is mechanically held in place via an anti-rotation pin 50 (see FIG. 4). Said chuck receiver 20 provides a press-fit attachment of an extending shaft portion 30 being approximately two (2) inches in length and one-half (½) inch in diameter and envisioned being made of a rugged metal such as hardened steel, or an equivalent metal. The shaft 30 further comprises a socket receiver portion 32 at an end portion which allows quick attachment of various sized bit sockets 110 and other driver tools which utilize an attaching hex shaft portion (see FIG. 2b).

Figure 2B:
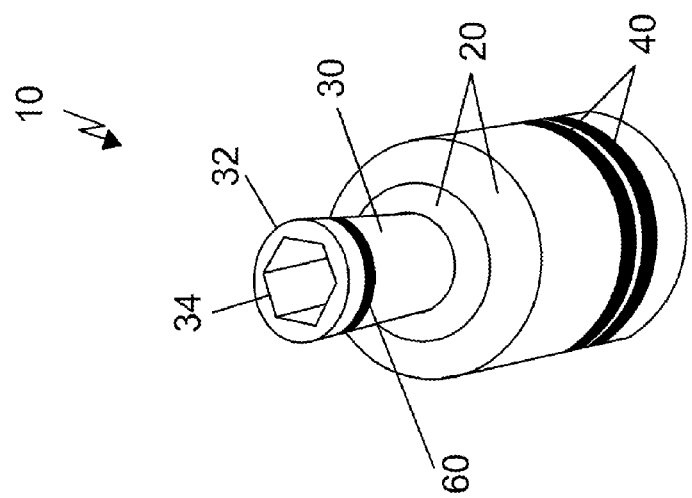
FIG. 2b is a close-up view of a socket receiver portion 32 of the drill motor adapter 10, according to a preferred embodiment of the present invention.
Figure 2A:
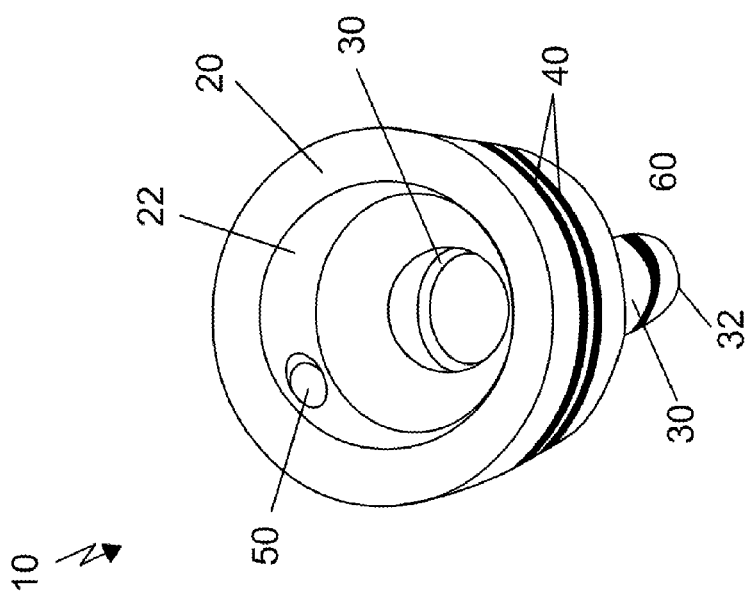
FIG. 2a is a close-up view of a chuck receiver portion 20 of the drill motor adapter 10, according to a preferred embodiment of the present invention.

Referring now to FIGS. 2a and 2b, close-up views of end portions of the device 10, according to a preferred embodiment of the present invention, are disclosed. The chuck receiver portion 20 of the device 10 further comprises cylindrical and conical-shaped milled internal spaces which constitute an inner bore portion 22 being designed to slidingly receive a standard drill chuck 102 within. Said drill chuck 102 is secured within the chuck receiver 20 via inserting engagement of a spring-loaded anti-rotation pin portion 50 being incorporated into a chuck key aperture portion 104 located on a side surface of said drill chuck 102. The inserted position of the anti-rotation pin 50 into said chuck key aperture 104 is retained via two (2) first retaining rings 40 which are in turn positioned within respective first retaining ring slots 42 being cut radially into an outer surface of the chuck receiver 20 being arranged in a parallel manner around an outer surface, so as to contact an outer end portion of said anti-rotation pin 50 (see FIGS. 4 and 5).

Figure 5:
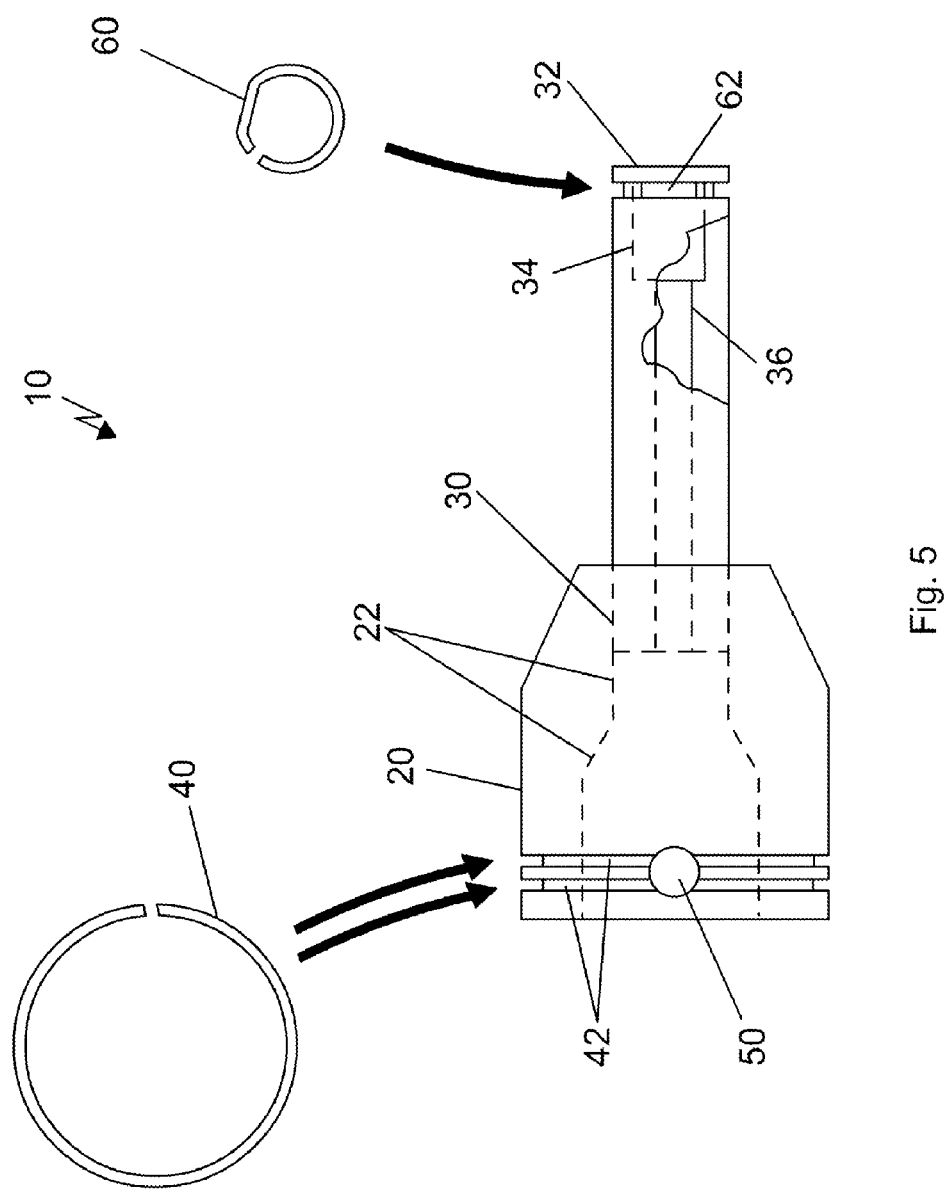

The device 10 further provides an extending shaft portion 30 which provides an internal drill bit clearance aperture 36 which allows installation of the device 10 upon the drill motor 100 without a need to remove a previously installed drill bit 105 (see FIG. 5). The shaft 30 also provides a mechanical coupling means for attachment of standard bit sockets 110 via a socket receiver portion 32 located at an opposing outer end portion. Said socket receiver 32 comprises features to enable attachment of the bit sockets 110 including a second retaining ring 60, a second retaining ring slot 62, and a hex aperture 34. The second retaining ring slot 62 entraps the second retaining ring 60 at a radial orientation being slightly recessed from an end portion of said shaft 30. Said second retaining ring slot 62 also allows partial intrusion of said second retaining ring 60 within the internal hex aperture 34 portion of the shaft 30 so as to apply a holding spring force against a bit socket 110 when inserted into said hex aperture portion 34.

The socket receiver portion 32 also enables coupled insertion of other driving tools which incorporate a standard hex shaft portion including screwdriver adapters, star sockets, hex key wrenches, and other fastener driving tools.

Figure 3:
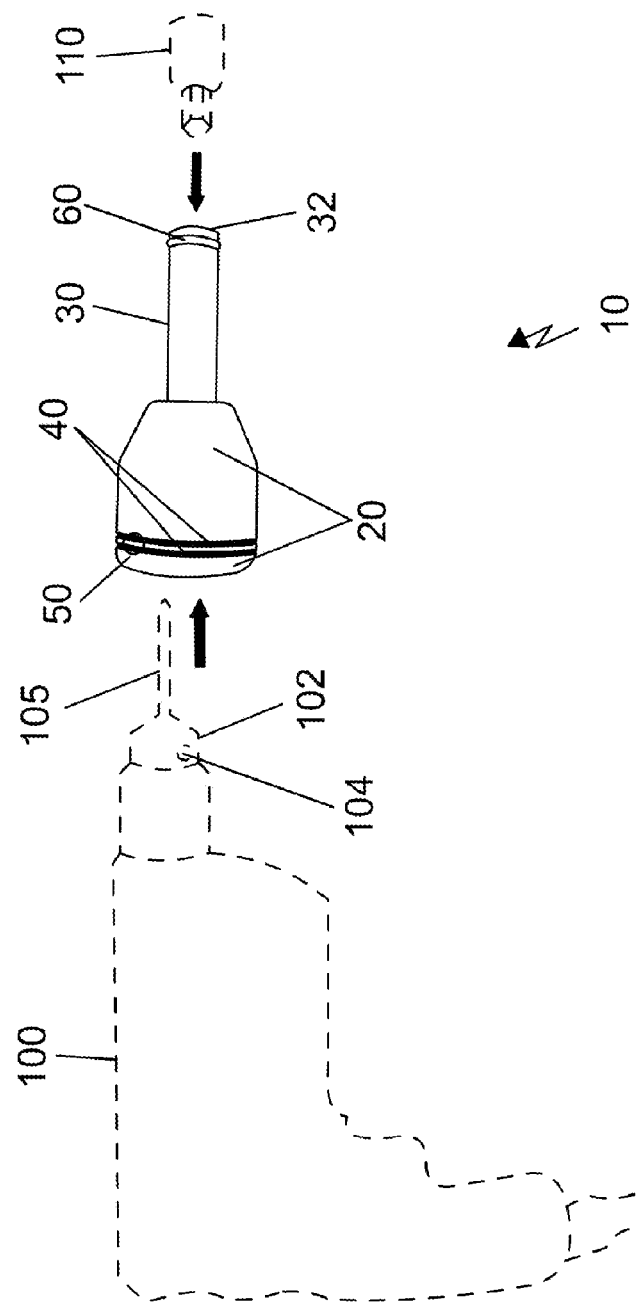
FIG. 3 is an environmental view of the drill motor adapter 10, according to a preferred embodiment of the present invention.

Referring now to FIG. 3, an environmental view of the device 10, according to a preferred embodiment of the present invention, is disclosed. In use, it is envisioned that a user may drill a hole in a conventional manner using the drill motor 100 configured with a drill bit 105, then slide the device 10 over the drill chuck portion 102, install a desired bit socket 110, and drive one (1) or more fasteners. Such features enable a drill motor 100 to provide the functions of two (2) typically separate power tools.

Figure 4:
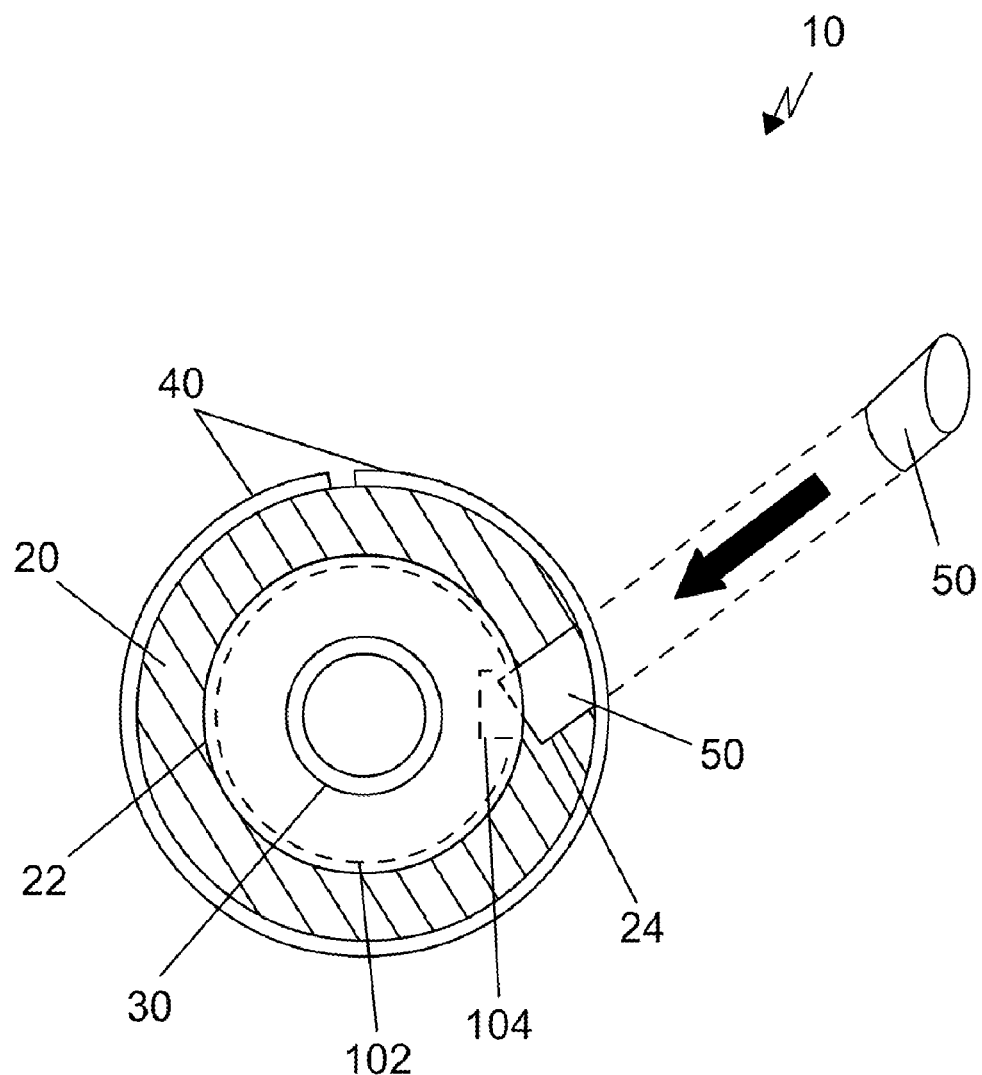
FIG. 4 is a section view of the chuck receiver portion 20 of the drill motor adapter 10 taken along section line A-A (see FIG. 1), according to a preferred embodiment of the present invention; and, FIG. 5 is an exploded view of the drill motor adapter 10, according to a preferred embodiment of the present invention.

Referring now to FIG. 4, a section view of the chuck receiver portion 20 of the device 10 taken along section line A-A (see FIG. 1), according to a preferred embodiment of the present invention, is disclosed. The device 10 comprises an anti-rotation pin 50 and a pin aperture 24. The anti-rotation pin 50 comprises a cylindrically-shaped and hardened steel pin which provides a mechanical coupling means between the device 10 and the drill chuck portion 102 of the drill motor 100. Said anti-rotation pin 50 is slidingly inserted into the pin aperture 24 and subsequently engages a chuck key aperture portion of the drill chuck 102. Said anti-rotation pin 50 comprises a contoured outer surface so as to be held in place via the first retaining rings 40 being nested within the first retaining ring slots 42.

The pin aperture 24 is drilled at an angle of approximately thirty-seven (37) degrees from perpendicular, into an external surface of an open end of the chuck receiver 20. Said pin aperture 24 comprises a machined hole having a diameter which provides sliding insertion of the anti-rotation pin 50. Said pin aperture 24 further comprises a flat bottom portion and is machined to a particular depth so as to partially cut into the inner bore portion 22, thereby allowing partial angled protrusion of the inserted anti-rotation pin 50 into said inner bore 22. Said anti-rotation pin 50 and pin aperture 24 are positioned in such a manner, as to allow the anti-rotation pin 50 to engage the chuck key aperture portion 104 of the drill chuck 102. For orientation purposes, the device 10 is illustrated here as viewed from a drill motor 100 side. The angled orientation of the pin aperture 24 enables the anti-rotation pin 50 to engage the chuck key aperture portion 104 in an angled manner, thereby mechanically communicating a normal clockwise rotation of the drill chuck 102 to the device 10 to drive a fastener. Conversely, motioning of the device 10 in a clockwise direction with the drill chuck 102 at rest, will cause the anti-rotation pin 50 to slide in an outward direction, thereby flexing the first retaining rings 40 to allow easy separation and removal of the device 10 from the drill motor 100.

Referring now to FIG. 5, an exploded view of the device 10, according to a preferred embodiment of the present invention, is disclosed. The device 10 comprises a pair of first retaining rings 40 and a second retaining ring 60. Said retaining rings 40, 60 are envisioned to be made using a round cross-section spring-steel wire being formed in generally circular shapes and providing flexibility via opening portions to enable normal springing expansion and contraction. The first retaining rings 40 are sized so as to encompass and be nested within the aforementioned first retaining ring slots 42, thereby holding the anti-rotation pin 50 within the pin aperture 24. The second retaining ring 60 provides an external snap ring function, being nested within a respectively sized second retaining ring slot 62. Said second retaining ring 60 further comprises a flat perimeter portion designed to protrude slightly into the internal hex aperture portion 34 of the socket receiver portion 32, thereby securing an inserted bit socket 110 by applying a spring side force.

The shaft portion 30 of the device 10 comprises a drill bit clearance aperture 36 located along a center axis which comprises a longitudinal drilled hole capable of containing a one-quarter (¼) inch drill bit 105, thereby enabling the device 10 to be installed upon the drill motor 100 without having to remove a previously installed drill bit 105, therefore saving time when switching between the drilling and fastener driving tasks.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 3.

The method of utilizing the device 10 may be achieved by performing the following steps: mounting a drill bit 105 into a drill chuck portion 102 of an existing drill motor 100 in a conventional manner; drilling a desired number of holes; inserting said drill bit 105 and drill chuck 102 portions of the drill motor 100 into the inner bore portion 22 of the device 10 while continually applying a counter-clockwise rotation of the device 10; rotating the device 10 until obtaining a snapping engagement of the anti-rotation pin 50 into the chuck key aperture portion 104 of the drill chuck 102; stopping rotation of the device 10; inserting a suitably sized bit socket 110, or other driving tool, into the hex aperture portion 34 of the socket receiver 32; driving fasteners into the previously drilled holes; removing the device 10 from the drill motor 100 by applying a clockwise rotation of the device 10 to disengage the anti-rotation pin 50 from the chuck key aperture 104; pulling the device 10 from the drill motor 100; repeating the above steps to convert the drill motor 100 back-and-forth between a drilling tool and a screw gun as needed to complete a project; and, benefiting from time and equipment costs saved by using the present invention 10.

The foregoing descriptions of specific embodiments have been presented for purposes of illustration and description. They are not intended to be exhaustive or to limit the invention and method of use to the precise forms disclosed. Various modifications and variations can be appreciated by one skilled in the art in light of the above teachings. The embodiments have been chosen and described in order to best explain the principles and practical application in accordance with the invention to enable those skilled in the art to best utilize the various embodiments with expected modifications as are suited to the particular use contemplated. It is understood that various omissions or substitutions of equivalents are contemplated as circumstance may suggest or render expedient, but is intended to cover the application or implementation without departing from the spirit or scope of the claims of the invention.

What is claimed is:
1. A drill motor adapter, comprising:
a receiver portion, having a drill connection end and a shaft connection end;
an interior bore disposed within said receiver portion and longitudinally coextensive therewith;
an anti-rotation pin removably placed within a pin slot located on said receiver portion;
a shaft portion having a first end removably connected to said shaft connection end of said receiver portion and extending outwardly therefrom and a second end; and,
a socket aperture located at said shaft portion second end;
wherein said interior bore is adaptable to removably connect to a drilling tool with a tool receiver coupling means;
wherein said anti-rotation pin provides a securing force to said drill tool when inserted within said internal bore to cease rotation of said drilling tool when energized;
wherein said anti-rotation pin slot further comprises an aperture having a flat bottom portion extending into said interior bore at a pin aperture angle perpendicular to a longitudinal axis of said adapter;
wherein said pin aperture angle enables said anti-rotation pin to engage a drill chuck portion of said drilling tool when said drilling tool is motioned in a clockwise direction;
wherein said pin aperture angle enables said anti-rotation pin to disengage a drill chuck portion of said drilling tool when said drilling tool is motioned in a counter-clockwise direction, wherein said tool receiver coupling means retains said anti-rotation pin;
wherein said shaft portion further comprises an internal clearance aperture within said shaft portion and extending from said socket aperture to said interior bore and longitudinally coextensive with said receiver portion;

wherein said internal clearance aperture enables said adapter to adaptably receive a drilling tool maintaining a pre-installed drill bit;

wherein said socket aperture is adaptable to removably connect to a drill bit socket with a socket receiver coupling means, further comprising:
- a socket receiver slot circumferentially disposed along an outer surface of said socket receiver adjacent to said receiver portion; and,
- a socket retaining ring for removable insertion within said socket receiver slot, further comprising a spring-steel wire being formed in a generally circular shape and having a flat perimeter portion located at an intermediate position along a diameter thereof that protrudes within said socket aperture;

wherein said socket retaining ring provides a securing force to an attached drill bit socket when inserted within said socket adapter; and, wherein when said adapter is connected to said drilling tool and said drill bit socket, said drilling tool is converted into a screw driving tool.

2. The adapter of claim 1, wherein said receiver portion further comprises an open-ended and cylindrically-shaped lightweight structure.

3. The adapter of claim 1, wherein said pin aperture angle is approximately thirty-seven degrees.

4. The adapter of claim 1, wherein said anti-rotation pin further comprises a cylindrically-shaped and hardened steel pin.

5. The adapter of claim 4, wherein said anti-rotation pin further comprises a contoured outer surface;
- wherein said tool receiver coupling means engages said contoured outer surface to retain said anti-rotation pin within said pin aperture.

6. The adapter of claim 1, wherein said tool receiver coupling means further comprises:
- a pair of tool receiver slots, each circumferentially disposed along an outer surface of said receiver portion adjacent to said drill connection end directly above said pin slot; and,
- a pair of tool retaining rings, each for removable insertion within an individual tool receiver slots;
- wherein said pair of tool retaining rings provides a securing force to said anti-rotation pin against an attached drilling tool when inserted within said interior bore.

7. The adapter of claim 6, wherein said pair of tool retaining rings each further comprises a spring-steel wire being formed in a generally circular shape.

8. The adapter of claim 1, wherein said shaft portion further comprises a resilient metallic fabrication.

9. The adapter of claim 1, wherein said socket aperture further comprises a hexagonal shape.

10. The adapter of claim 1, wherein said shaft portion is approximately two inches in length and one-half inch in diameter.

11. A drill motor adapter, comprising:
- a receiver portion comprising an open-ended and cylindrically-shaped lightweight having a drill connection end and a shaft connection end;
- an interior bore disposed within said receiver portion and longitudinally coextensive therewith;
- a pin slot having a flat bottom portion extending into said interior bore at a pin aperture angle perpendicular to a longitudinal axis of said adapter;
- an anti-rotation pin removably placed within said pin slot located on said receiver portion, further comprising a cylindrically-shaped and hardened steel pin with a contoured outer surface;
- a tool receiver coupling means, further comprising:
  - a pair of tool receiver slots, each circumferentially disposed along an outer surface of said receiver portion adjacent to said drill connection end directly above said pin slot; and,
  - a pair of tool retaining rings, each for removable insertion within an individual tool receiver slots;
- a shaft portion having a first end removably connected to said shaft connection end of said receiver portion and extending outwardly therefrom and a second end;
- a socket aperture located at said shaft portion second end;
- a socket receiver coupling means, further comprising:
  - a socket receiver slot circumferentially disposed along an outer surface of said socket receiver adjacent to said receiver portion; and,
  - a socket retaining ring for removable insertion within said socket receiver slot; and,
- an internal clearance aperture within said shaft portion and extending from said socket aperture to said interior bore and longitudinally coextensive with said receiver portion; and, wherein said tool receiver means is adaptable to removably connect a drilling tool to said interior bore;

wherein said anti-rotation pin provides a securing force to said drilling tool when inserted within said internal bore to cease rotation of said drilling tool when energized;

wherein said pair of tool retaining rings retain said anti-rotation pin within said pin slot and provides a securing force to said anti-rotation pin against said drilling tool when inserted within said interior bore;

wherein said tool retaining ring further comprises a spring-steel wire being formed in a generally circular shape; and, wherein said socket retaining ring further comprises a spring-steel wire being formed in a generally circular shape and further comprises a flat perimeter portion located at an intermediate position along a diameter thereof that protrudes within said socket aperture and provides a securing force to an attached drill bit socket when inserted within said socket adapter; and, wherein said internal clearance aperture enables said adapter to adaptably receive said drilling tool having a pre-installed drill bit.

12. The adapter of claim 11, wherein said socket aperture further comprises a hexagonal shape.

13. The adapter of claim 11, wherein said shaft portion is approximately two inches in length and one-half inch in diameter.

14. The adapter of claim 11, wherein said pin aperture angle is approximately thirty-seven degrees;
- wherein said pin aperture angle enables said anti-rotation pin to engage a drill chuck portion of said drilling tool when said drilling tool is motioned in a clockwise direction;
- wherein said pin aperture angle enables said anti-rotation pin to disengage a drill chuck portion of said drilling tool when said drilling tool is motioned in a counter-clockwise direction, wherein said tool receiver coupling means retains said anti-rotation pin.

* * * * *